(No Model.) 3 Sheets—Sheet 2.

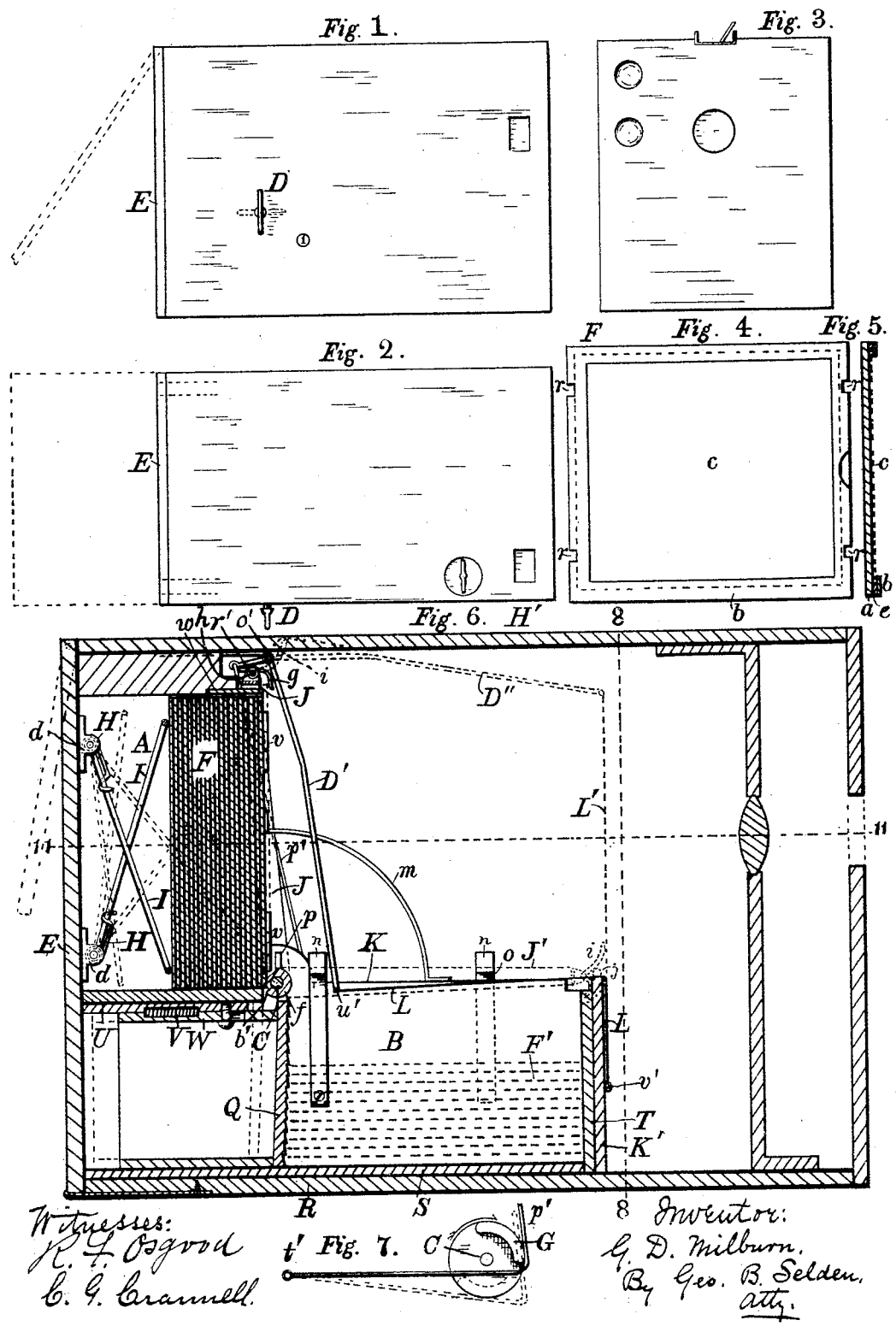

G. D. MILBURN.
PHOTOGRAPHIC MAGAZINE CAMERA.

No. 497,525. Patented May 16, 1893.

Witnesses:
R. F. Osgood
C. G. Crannell

Inventor:
G. D. Milburn,
By Geo. B. Selden,
atty (No Model.) 3 Sheets—Sheet 3.
G. D. MILBURN.
PHOTOGRAPHIC MAGAZINE CAMERA.
No. 497,525. Patented May 16, 1893.
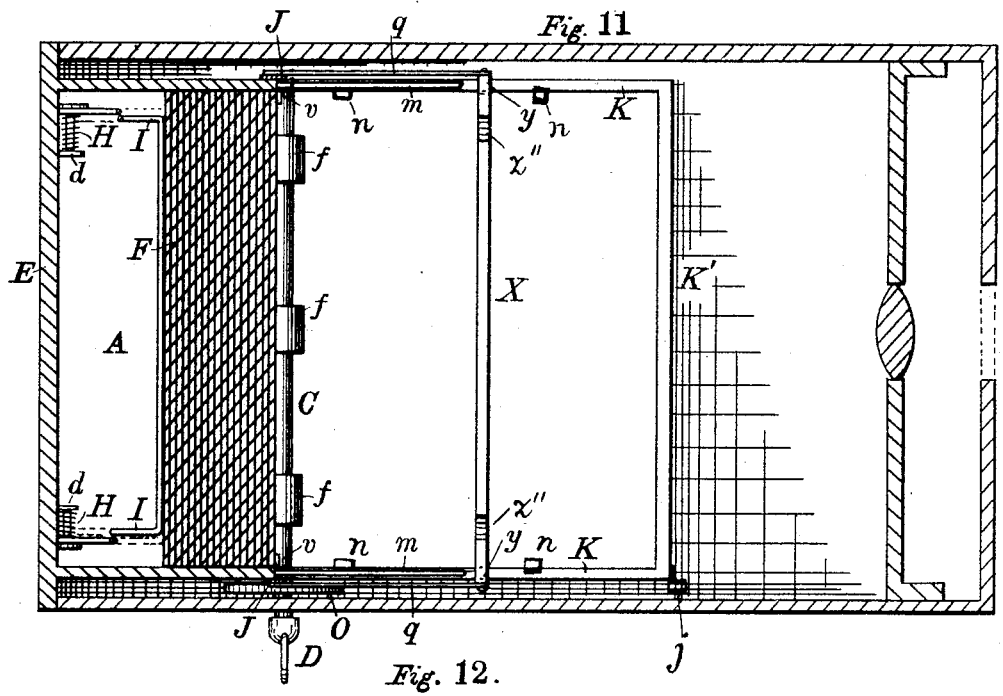
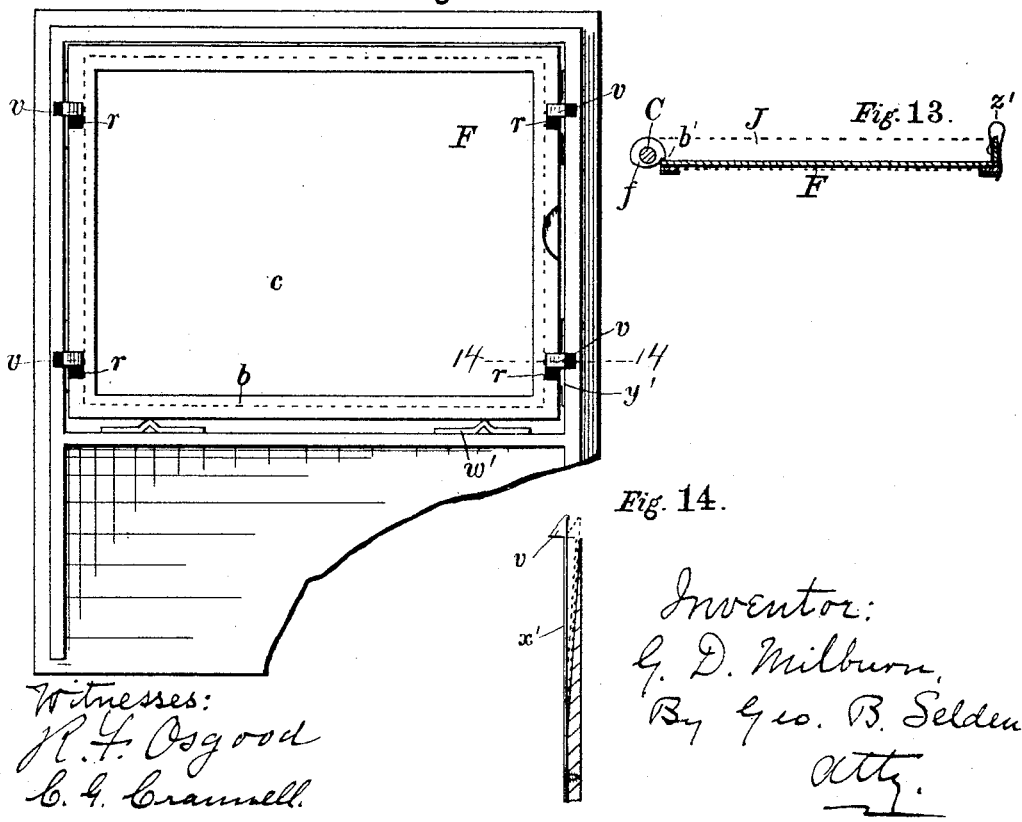

UNITED STATES PATENT OFFICE.

GUSTAVE D. MILBURN, OF ROCHESTER, NEW YORK, ASSIGNOR TO THE PHOTO MATERIALS COMPANY, OF SAME PLACE.

PHOTOGRAPHIC MAGAZINE-CAMERA.

SPECIFICATION forming part of Letters Patent No. 497,525, dated May 16, 1893.

Application filed July 14, 1892. Serial No. 440,030. (No model.)

*To all whom it may concern:*

Be it known that I, GUSTAVE D. MILBURN, a citizen of the United States, residing at Rochester, in the county of Monroe, in the State of New York, have invented an Improved Magazine-Camera, of which the following is a specification, reference being had to the accompanying drawings.

My invention relates to improvements in the construction of magazine cameras, which improvements are fully described and illustrated in the following specification and the accompanying drawings,—the novel features thereof being specified in the claims annexed to the said specification.

My improved magazine-camera is represented in the accompanying drawings, in which—

Figure 8:
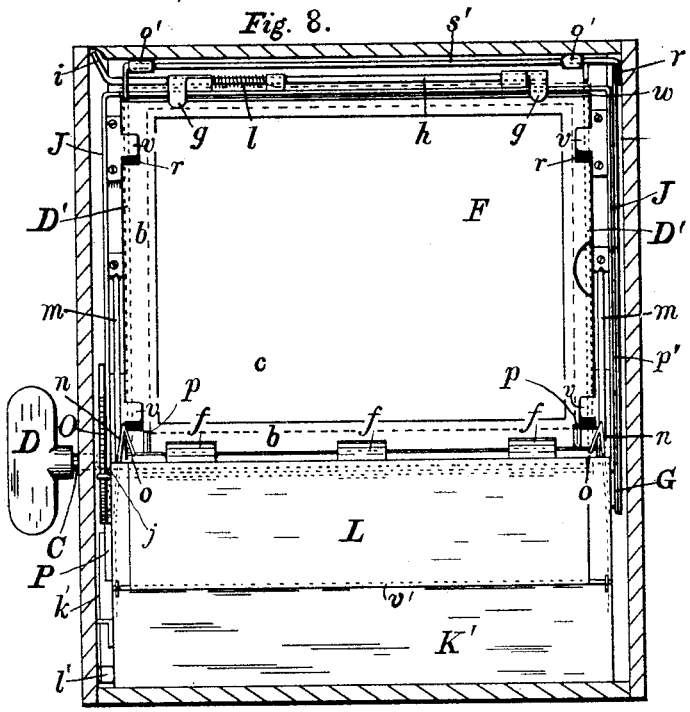
Figure 10:
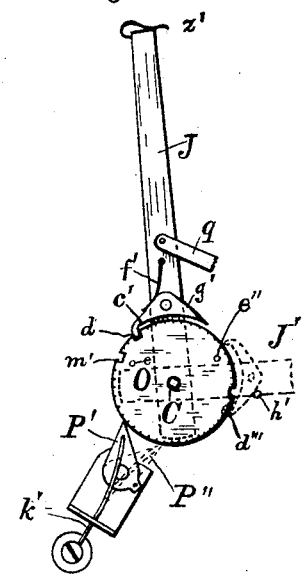
Figure 9:
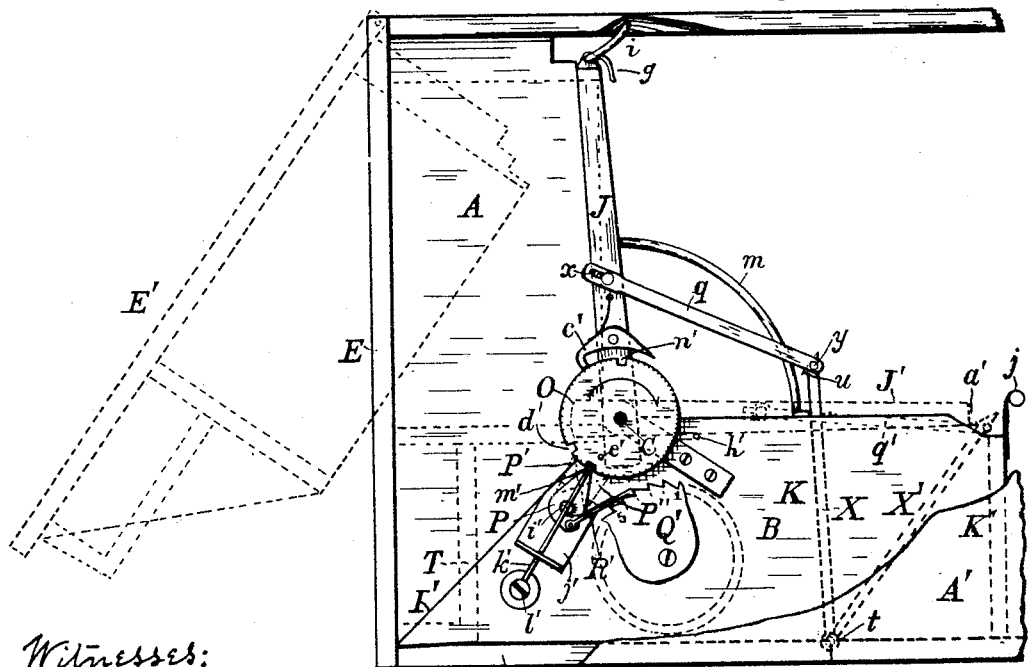

Figure 1 is a side-view. Fig. 2 is a plan view. Fig. 3 is a front view. Fig. 4 is a front view of the plate or film-carrier, detached. Fig. 5 is a transverse section of the same. Fig. 6 is a central longitudinal section through the camera. Fig. 7 represents the cam and rod for operating the curtain. Fig. 8 is a transverse section of the camera, on the line 8—8, Fig. 6. Fig. 9 is a side view of the carrier-shifting mechanism,—the outer wall of the camera being broken away. Fig. 10 represents the shifting mechanism detached. Fig. 11 is a horizontal section of the camera, on line 11—11, Fig. 6, showing the parts below that line. Fig. 12 represents the back of the camera detached, showing the compartment for unexposed plates with a carrier with plate or film therein. Fig. 13 is a vertical section through one of the carriers and the cam-shaft, representing the position of the cams at the time of the delivery of the carrier into the storage compartment. Fig. 14 is a section on the line 14—14, Fig. 12.

My improved magazine-camera is designed to use either glass-plates or transparent films of any preferred kind,—the plates or films being inserted in notched carriers, which are used in connection with certain devices in the camera to secure the shifting of the plates or films therein.

My invention is intended for use with any suitable usual lens and exposing shutter, and comprises two compartments, one, A, Fig. 6, in which the films are carried previous to the exposure under a pressure which constantly forces them forward, and another, B, into which the exposed plates are shifted one after the other, by the partial rotation of a shaft C, operated from the exterior of the camera by a key, D. The shaft C is provided with one or more notched cams $f$ which, after exposure act on the lower edge of the front plate-carrier and raise it up so that the notches in its edges coincide with certain stops on the camera, so that it may be pressed forward by the spring actuated frames I I in the compartment A, into position where it becomes engaged by a frame J which swings on the shaft C, by which it is carried into the compartment B.

My invention also contemplates various other details of the construction, all as hereinafter more fully described.

The camera body is of any preferred shape or dimensions. The rear end of the camera is closed by a back or hinged door E, which opens to permit the insertion of the unexposed plates or films into the compartment A. The plates or films are placed in the carriers, F, Figs. 4 and 5, which consist of a sheet $a$ of card or other suitable board, having a rectangular frame $b$ of similar material attached to them on three sides, leaving one side unattached so that the film $c$ can be slid into place between the frame and the back of the carrier. Strips, $e$, of suitable material are interposed between the frame and the back of the carrier to adapt the carriers to either glass-plates or films, these strips being made thicker for the carriers in which plates are used than for the film-carriers. It will be observed that the opposite edges of the back are provided with notches or indentations, $r\ r$, Fig. 4, which are preferably four in number. The plate-carriers when placed in the compartment A are pressed forward by any suitable spring actuated frames, such for instance as those indicated at I in Fig. 6, the springs being marked H, forcing the front carrier against the stops $v\ v$, Figs. 6, 8, 11, 12 and 14 which prevent its forward movement until it has been raised up by the cams on the shaft C, into the position indicated by the dotted lines on Fig. 6, when it is engaged by the swinging frame J by which it is shifted forward and downward into the storage compartment B.

The frames I I, Fig. 6 are pivoted to the back E at $d$, and pressed forward against the rear film-carrier, or a follower in contact therewith, by the springs H H. The frame J is swung forward and downward, into the position represented at J', Fig. 6, by the turning of the shaft C by the key D. The construction is such that the shaft C makes a part of a rotation, so as to allow the cams $f$ to raise the front film-carrier, until the notches $r$ correspond with the stops $v$, before the frame J is moved by the shaft.

$g\ g$ are two fingers carried by the frame, and the upper edge of the film-carrier is forced between these fingers and the upper cross-bar of the frame when the film carrier is elevated. The partial rotation of the shaft C before the frame J begins to move, raises the front carrier, so that the notches $r$ register with the stops $v$, when the front carrier is pressed forward by the springs or follower, and the upper edge of the carrier is, by the continued movement of the shaft, inserted between the fingers $g\ g$ and the top cross-piece of the frame J. When the frame swings, it consequently carries the carrier with it, the top of the frame bearing against the rear side of the carrier, which is retained in place by the fingers bearing on its front side. Provision is made for swinging these fingers outward from the frame at the extremity of its downward movement, by attaching them to a rock-shaft $h$ having at one end an arm $i$, which comes in contact with the lug or stop $j$ on the camera body. The rock-shaft is mounted on the cross-bar of the frame in suitable eyes, and it is provided with a spring $l$ which holds the fingers against the film-carrier. A metallic plate $w$ forms the upper edge of the compartment A, or the whole of the compartment may be made of sheet metal. The stops $v$ are attached to the edges of the compartment on the vertical sides, and either two or four of these stops may be used. Suitable guides $m$ may be attached to direct the film carrier into the compartment B, or the side walls K may be extended upward for this purpose. On the side walls are placed the springs $n\ n$, which are inclined inward at their upper ends forming the hooks $o\ o$ so that they yield outward when the film-carrier strikes against them, and then engage over it so as to prevent its being shaken out of the compartment. I have represented four springs in the accompanying drawings, but two are sufficient. The springs may be attached on either the inside or the outside of the walls K, or dispensed with entirely in case positively actuated means be employed to retain the carriers in the storage chamber such as the sliding door Q hereinafter described.

In order to hold the carriers in the lower compartment, the sliding door Q, Fig. 6, may be employed. This door is arranged to be moved backward, as indicated by the full and dotted lines, by the pins $p\ p$ on the shaft C coming in contact with the upper corners of the door, just before the frame J delivers the carrier into the compartment. The door is returned by a suitable spring, and being slightly inclined to the lower side R of the camera, it presses against the uppermost carrier, and in this way secures the carriers in place. The front of the door may be corrugated or toothed. The door may be arranged to slide on the bottom of the camera, or, preferably, it is contained in a case or drawer, which is made to slide entirely out of the compartment when the back E is open, so that all the carriers containing exposed films, may be removed at once.

S represents the bottom of the drawer, and T the end-wall of the same opposite the door Q. Between the end-wall and the door, the drawer has no sides, or if used they are made of thin sheet metal.

U is a cover to the rear part of the drawer, attached to the bottom by suitable sides, and V is a spring in a suitable recess which acts on the arm or plate W, and forces the door Q forward. The movement of the door is limited by suitable stops.

In order to provide a cover or screen for the carriers in the compartment B, I employ the movable frame D' to which the curtain L Fig. 6, is attached, which curtain lies normally over the compartment, B, but, at the time the frame J oscillates, is moved upward by the frame D', into the position indicated at L'. The frame D' is pivoted above the frame J, at $o'$, Figs. 6 and 8, and swings on such pivots, as indicated by the full and dotted lines in Fig. 6. The movement of the frame D' is obtained from the cam G on the shaft C, as indicated in Fig. 7,—the cam G drawing down on the rod $p'$ pivoted to a crank-arm $r'$ on the upper cross-bar $s'$ of the frame D'. The rod $p'$ is attached to the side-wall of the compartment B at $t'$, as indicated in Fig. 7. As the cam G revolves, it draws down on the rod $p'$, and swings the frame from D' to D''. This movement takes place just before the frame J is moved forward, so that during the period of its oscillation, the curtain occupies the position L', out of the way of the frame. The curtain is attached at one end to the lower cross-bar $u'$, Fig. 6, of the frame D', and at the other end to rod $v'$ secured to the front wall K' of the compartment B. The use of the movable screen or curtain will dispense with the springs $n$.

In the construction represented in Fig. 9, a door X is pivoted within the lower compartment, and connected with the frame J by the links $q\ q$, so that the carriers are shifted lengthwise in the compartment, and retained in place by door X when at the extremity of its oscillating movement toward the lower compartment. The door is pivoted on a transverse rod $s$,—a coiled spring $t$ being applied to the rod in such fashion as to swing the upper end of the door to the left hand in Fig. 9.

The spring $t$ is an ordinary spiral spring coiled about the rod $s$, and bearing at one end against the case of the camera, and at the other against the door, so that the door receives from the spring a constant tendency to swing toward the right hand in Fig. 9. This spring serves to retain the frame J in the upright position indicated by the full lines. When the frame is swung forward, the links and door occupy the positions indicated by the dotted lines in Fig. 9, and the carrier is delivered on the door from the frame, and is by the swinging motion of the door shifted lengthwise in the compartment against the wall T, which is attached to the back E.

$y\ y$ represent pins or studs which project from each side of the door over the side-walls K of the lower compartment, which are cut away at $a'$ to permit the movement of the pins. One end of the links $q$ may be slotted and pivoted with a spring $x$, which allows the door to yield slightly as the carriers accumulate in the compartment.

The door X is provided with a ledge $u$ which prevents a carrier from slipping above it. The upper edge of the door X is notched at $z''$, Fig. 11, to permit the movement of the gripper-fingers $g\ g$. These notches are cut in the upper edge of the door X, opposite the gripper-fingers of sufficient width and depth to permit the fingers to open away from the top of the frame J when the arm $i$ comes in contact with the stop $j$ as the frame approaches the end of its swinging movement, which is represented at J', Fig. 9. The door protects the plates or films in the carriers from light, and also retains the carriers in the compartment. The door may project some distance above the side-walls K without interfering with the image on account of the obliquity of the rays received from the lens.

The construction of the mechanism by which the frame J is operated from the shaft C, will be understood from an examination of Figs. 6, 9, 10 and 13. The shaft at first makes a partial rotation, while the notches $b'$ in the cams $f$, Fig. 6, raise the foremost carrier. The frame J is then swung forward and downward to J', after which the shaft continues to rotate while the cams deliver the carrier into the storage compartment, as represented in Fig. 13. Any suitable mechanism may be employed to secure these movements. In the accompanying drawings I have shown a construction in which the requisite movements of the shaft and frame are secured by means of a pivoted catch $c'$, Figs. 9 and 10, engaging with a notch $d'$ in the edge of the disk O, and a pin $e'$, inserted in the disk and projecting inward so as to bear against an extension of the arm. At the commencement of the movement of the shaft C, in the direction indicated by the arrow in Fig. 9, the notch $d'$ occupies the position represented in that figure. The disk O turns with the shaft, until the notch arrives at $d''$ Fig. 10, when the catch $c'$, which is pivoted on the frame J, and provided with a spring $f'$, engages with the notch, and the frame is caused to move with the shaft until the inclined front side of the catch $g'$, comes in contact with the stationary pin or stop $h'$, when the catch is disengaged from the notch, and the frame being arrested, the shaft continues to rotate until the cam $f$ has delivered the sheet into the storage compartment. At the end of the movement of the shaft, the notch $d'$ will have arrived at $d'''$, Fig. 10, and the pin $e'$ at $e''$ acts as a stop to prevent farther movement of the shaft. On the return motion the pin $e$ bears against the extension of the frame, and restores the frame to its upright position. The disk, catch and stop are used on each side of the camera. The disk O is milled or serrated around its edges, and a pivoted dog P is employed to prevent its being turned backward during its movement in either direction until such movement has been completed. By this device the operator is prevented from making a partial movement of the parts, since as the key cannot be turned backward, the forward movement in either direction must be completed. The dog P is pivoted at $i'$ to the side of the compartment or to a plate $j'$ thereon. Its point at the commencement of the movement of the disk rests in the notch $m'$, but, as soon as the disk moves, the dog swings to the position P',—the spring $k'$ holding the point against the edge of the disk. It will be obvious that in this position of the dog, the disk O cannot be turned backward, because the point of the dog will engage in the serrations and prevent reverse movement. When the disk has completed its forward movement, the point of the dog will be carried by the spring $k'$ into the notch $n'$, and then on the return or reverse movement of the disk, the dog will be swung outward into the position indicated at P'', its point bearing against the serrations on the edge of the disk, and in this position it will prevent a reversal of the return movement. At the end of the return movement, the dog, again swings into the notch $m'$, and, when the disk is again turned, it assumes the position P', as before. This device may be used in connection with any camera in which the plates or films are shifted by the oscillation of an operating key or shaft. I may make the frame $b$ attached to the back $a$ of the carrier, of sheet gelatine, cut out to the proper shape and attached to the back by gelatine or any other suitable cement.

In the construction represented in Fig. 6, the carriers F are placed in the compartment A, when the door or back E is open,—the springs for pressing the carriers forward being attached to the back. In this case the upper wall of the camera may be provided with a removable panel or door, H', Fig. 6, through which access may be had to the front of the compartment A, to see that the carriers are properly placed, while in the dark-room.

In a modification, the compartment A is attached to the back E,—the side-wall being divided on the line I', Fig. 9. In this case the back E is hinged so that it can be reverted or turned entirely over, so as to afford free access to the compartment A,—the stops v being arranged to swing outward for the purpose of introducing the carriers. This construction is represented in Figs. 12 and 14, in which the compartment is shown as provided with metallic ribs or guides, w', on which the carriers travel, and the stops v are supported by springs, x', so that they can yield outward when the carriers are introduced. The sides of the compartment are slotted to permit the movements of the spring-stops.

Metallic ways y' may be provided on which the carriers travel, and which are slotted for the spring-stops.

Springs z', Figs. 10 and 13, may be applied to the upper part of the shifting frame J, in place of the fingers already described. These springs engage with the upper end of the carrier, and retain it in place until discharged from the frame by the operation of the cams f.

The movement of the pivoted dog P is utilized to operate the tally disk Q', by means of the spring pawl R' which engages with the teeth of the disk, which is only partially shown in full lines.

An opening is made in the side of the camera through which a series of figures indicating the number of exposures made, can be observed,—the disk being placed close up to the wall, so as to exclude any light.

I claim—

1. The combination, in a magazine camera, of the compartment A, having stationary stops at its inner edges, adapted to contain a series of notched film-carriers, and provided with means for pressing the carriers forward, the shaft C arranged across the camera near the inner lower corner of the compartment, and having one or more cams f adapted to engage with the lower edge of the front carrier, and to elevate the same, the oscillating frame J, pivoted on the shaft C, and provided with a device for engaging the upper edge of the front carrier, mechanism for operating the swinging frame during a portion of the rotation of the cam shaft, and the storage compartment B for exposed plates, substantially as described.

2. The combination, in a magazine camera, of the compartment A, having stationary stops at its inner edges, adapted to contain a series of notched film-carriers, and provided with means for pressing the carriers forward, the shaft C arranged across the camera near the inner lower corner of the compartment, and having one or more cams f adapted to engage with the lower edge of the front carrier, and to elevate the same, the oscillating frame J, pivoted on the shaft C, and provided with a device for engaging the upper edge of the front carrier, mechanism for operating the swinging frame during a portion of the rotation of the cam-shaft, the storage compartment B for exposed plates, the movable storage-compartment-screen L and mechanism for operating the same from the cam-shaft, substantially as described.

3. The combination, in a magazine camera, of the transverse shaft C, having one or more carrier-separating cams f, the oscillating carrier-shifting-frame J, pivoted on the shaft, and suitable operating mechanism connecting the shaft and the frame, whereby the cam receives a partial rotation while separating the front carrier before the frame begins to oscillate, substantially as described.

4. The combination, in a magazine camera, of the compartment A adapted to contain a series of notched film-carriers, the transverse shaft C having one or more carrier-separating cams f, the oscillating carrier shifting frame J, pivoted on the shaft and provided with a device for engaging the front carrier, the storage compartment B, and means for disengaging the carrier from the frame upon its arrival at the compartment B, substantially as described.

5. The combination, in a magazine camera, of a compartment provided with stationary stops on its inner edges, and adapted to contain a series of notched carriers, a second compartment located in front of and below the first, an oscillating shaft provided with means for sliding the notched carriers until the notches register with the stops, means for pressing the carriers forward, an oscillating frame pivoted on the shaft which receives and delivers the carriers one by one into the second compartment, an oscillating door in the second compartment which shifts the carriers lengthwise in the second compartment, and suitable connecting mechanism for operating the door, substantially as described.

GUSTAVE D. MILBURN.

Witnesses:
JOHN A. ROBERTSON,
GEO. B. SELDEN.